United States Patent
Gordic

(10) Patent No.: US 7,147,781 B2
(45) Date of Patent: Dec. 12, 2006

(54) BACKWASH SYSTEM AND METHOD FOR WASTE WATER TREATMENT SYSTEM

(76) Inventor: Mijodrag Gordic, 4842 Sardis Street, Burnaby, British Columbia (CA) V5H 1L5

(*) Notice: Subject to any disclaimer, the term of this patent is extended or adjusted under 35 U.S.C. 154(b) by 83 days.

(21) Appl. No.: 11/101,421

(22) Filed: Apr. 8, 2005

(65) Prior Publication Data

US 2006/0226070 A1  Oct. 12, 2006

(51) Int. Cl.
*C02F 3/02* (2006.01)
(52) U.S. Cl. .......... 210/618; 210/623; 210/629; 210/151; 210/194
(58) Field of Classification Search .......... 210/616, 210/617, 618, 621, 623, 626, 629, 150, 151, 210/194, 195.3, 197
See application file for complete search history.

(56) References Cited

U.S. PATENT DOCUMENTS

| | | | | |
|---|---|---|---|---|
| 1,099,396 A | * | 6/1914 | Rothwelll | 210/197 |
| 1,179,658 A | * | 4/1916 | Rothwell | 210/197 |
| 3,855,120 A | * | 12/1974 | Garbo | 210/618 |
| 4,177,144 A | * | 12/1979 | Hickey et al. | 210/151 |
| 4,482,458 A | * | 11/1984 | Rovel et al. | 210/150 |
| 4,547,286 A | | 10/1985 | Hsiung | |
| 4,707,252 A | * | 11/1987 | Durot et al. | 210/151 |
| 5,372,712 A | * | 12/1994 | Petit | 210/618 |
| 5,472,610 A | * | 12/1995 | Jonsson | 210/617 |
| 5,565,098 A | * | 10/1996 | Vellinga | 210/197 |
| 5,630,936 A | | 5/1997 | Oyzboyd | |
| 5,895,567 A | * | 4/1999 | Van Der Herberg | 210/150 |
| 5,993,650 A | * | 11/1999 | Kim | 210/150 |
| 6,048,459 A | * | 4/2000 | Khudenko | 210/617 |
| 6,328,892 B1 | | 12/2001 | Jones | |
| 6,527,948 B1 | * | 3/2003 | Haridas et al. | 210/194 |

* cited by examiner

Primary Examiner—Christopher Upton
(74) Attorney, Agent, or Firm—Brian M. Long

(57) ABSTRACT

A backwash system and method for a waste treatment system employ a waste inlet duct extending into an accumulation of microbial growth media particles in a lower region of a tank, with a vertical duct having a duct outlet in an upper region of the tank. A downwardly convergent strainer extends around the vertical duct beneath the duct outlet, with a liquid collector beneath the liquid leakage openings and a liquid outlet from the liquid collector communicating with the exterior of the tank. Compressed air is supplied into the vertical duct to impel the waste water up to the duct outlet and onto the strainer. A solids return duct has an upper end opening through the downwardly convergent strainer and a lower end opening above the accumulation of microbial growth media particles.

9 Claims, 3 Drawing Sheets

BACKWASH SYSTEM AND METHOD FOR WASTE WATER TREATMENT SYSTEM

BACKGROUND OF THE INVENTION

1. Field of the Invention

The present invention relates to a backwash system for a waste water treatment system, and to a method of treating and backwashing waste water from a waste water treatment system.

2. Description of the Related Art

In the treatment of domestic sewage and other waste water, it is known to employ a treatment tank into which the waste water is discharged. In the tank, the waste water is subjected to an aeration process in an aerobic treatment chamber, which causes bacterial colonies to grow rapidly in the aerobic treatment chamber. The thus-treated waste water then passes through a conical filter into a clarification chamber, while solids in the waste water to drop back from the clarification chamber into the aerobic treatment chamber. From the clarification chamber, treated effluent outflows to a disposal system.

It is an object of the present invention to provide a novel and improved backwash system and method which can be used for further treatment of the effluent and for recycling treated liquid from the effluent.

BRIEF SUMMARY OF THE INVENTION

According to the present invention, there is provided a backwash system for a waste treatment system, comprising a waste inlet duct extending into a lower region of a tank, with an accumulation of bacterial growth media particles in the lower region of the tank and a vertical duct extending from the lower region of the tank and having a duct outlet in an upper region of the tank. A downwardly convergent strainer extending around the vertical duct beneath the duct outlet has liquid leakage openings, and a liquid collector beneath the liquid leakage openings communicates through the liquid outlet with the exterior of the tank. A solid return duct, having an upper end opening through the downwardly convergent strainer, has a lower end opening above the accumulation of bacterial growth media particles, and an air inlet duct communicates with the vertical duct at the lower region of the tank.

In operation of this system, compressed air supplied through the air inlet duct into the vertical duct causes waste water in the lower region of the tanks to be impelled upwardly through the vertical duct so as to be discharged from the duct outlet into the strainer. At the strainer, solids in the waste water pass downwardly, under gravity, on an upper surface of the strainer to the solids return duct, through which the solids are returned to the accumulation of bacterial growth media particles. Liquid discharged from the duct outlet into the strainer passes through the strainer into the liquid collector, and can then be recycled to the waste water treatment system.

The strainer is, preferably, a frusto-conical perforated sheet metal strainer, and in a preferred embodiment of the invention the solids return duct extends coaxially around the vertical duct, the upper end of the solids return duct opening into a lowermost portion of the downwardly convergent strainer for receiving the solids from the strainer.

BRIEF DESCRIPTION OF THE DRAWINGS

The invention will be more readily understood from the following description of an embodiment thereof given, by way of example only, with reference to the accompanying drawings, in which:—

DESCRIPTION OF THE PREFERRED EMBODIMENT

Figure 1:
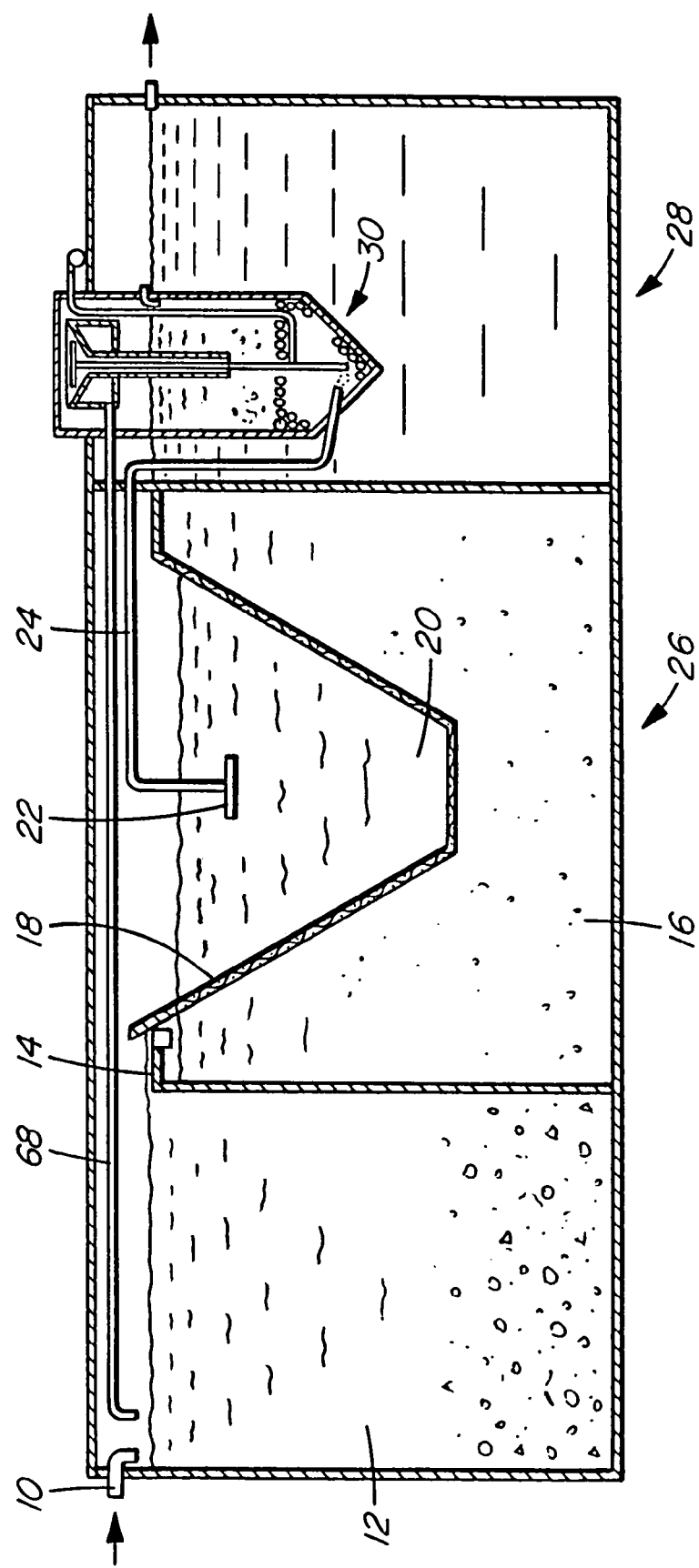
FIG. 1 shows a diagrammatic view taken in vertical cross-section through a waste water treatment system provided with a backwash system embodying the present invention.

Referring firstly to FIG. 1 of the accompanying drawings, there is shown a waste water treatment system which has a waste water inlet 10 for discharging untreated waste water, for example domestic sewage, into a settlement tank 12.

From this settlement tank 12, the waste water passes over a weir 14 into an aerobic treatment chamber 16, in which the waste water is aerated, causing bacterial colonies to grow rapidly, and thereby to break down the waste water. The thus-treated waste water passes into a clarification chamber 20, while solids in the waste water are retained in the aeration chamber 16. From the clarification chamber 20, the treated waste water passes through an outlet tee 22 to an outlet duct 24 for further treatment.

The aerobic treatment chamber 16 and the clarification chamber 20 are provided in a tank, indicated generally by reference numeral 26, and together with the tank 26 and associated components form a commercially available sewage treatment plant manufactured and marketed under the trademark "WASTECAN" by Canadian Wastewater Solutions Ltd., of Surrey, British Columbia, Canada.

FIG. 1 also shows a third tank, indicated generally by reference numeral 28, which contains a backwash system, indicated generally by reference numeral 30, embodying the present invention.

Figure 2:
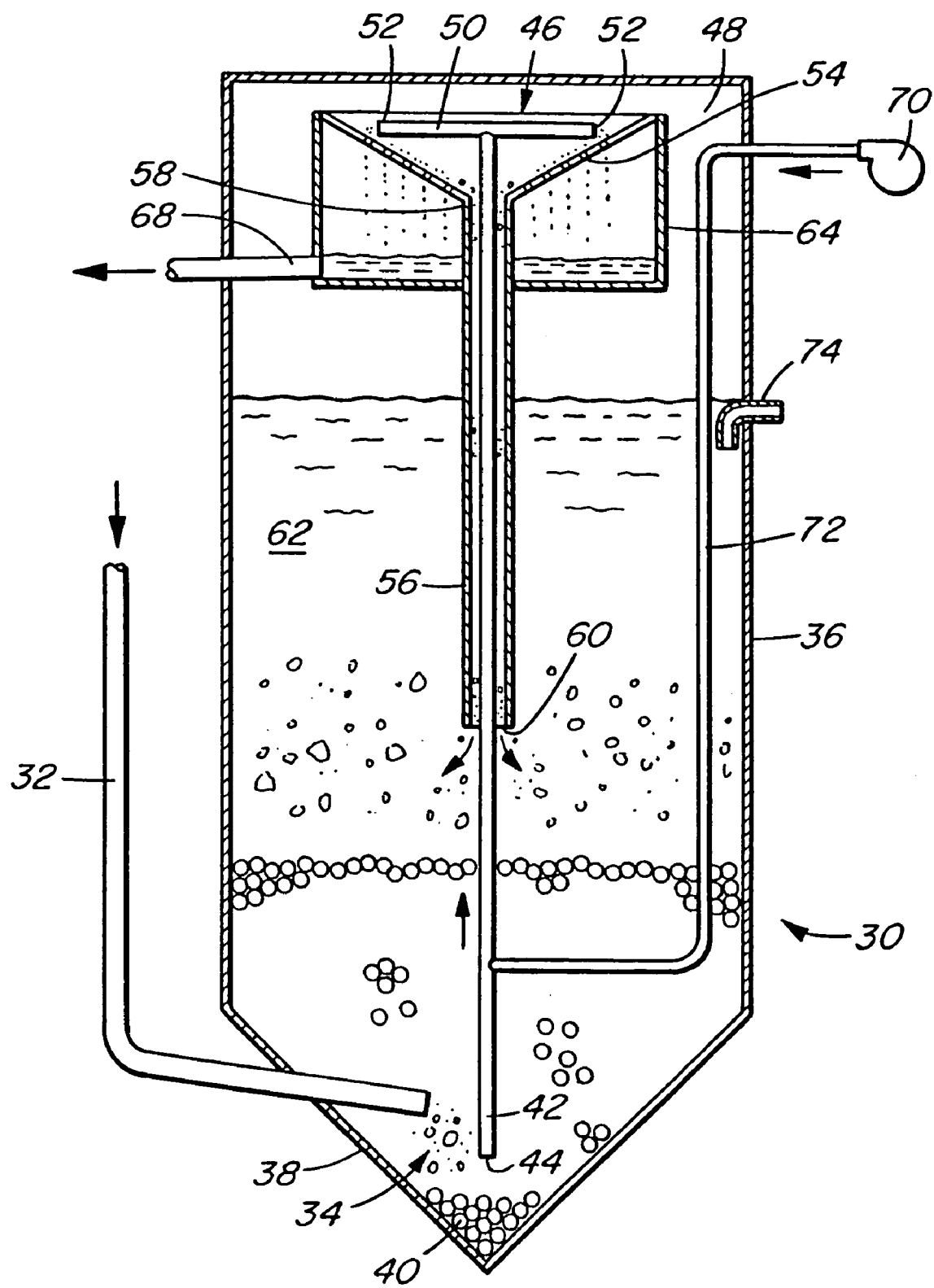
FIG. 2 shows a diagrammatic view in vertical cross-section through the backwash system of FIG. 1.
Figure 3:
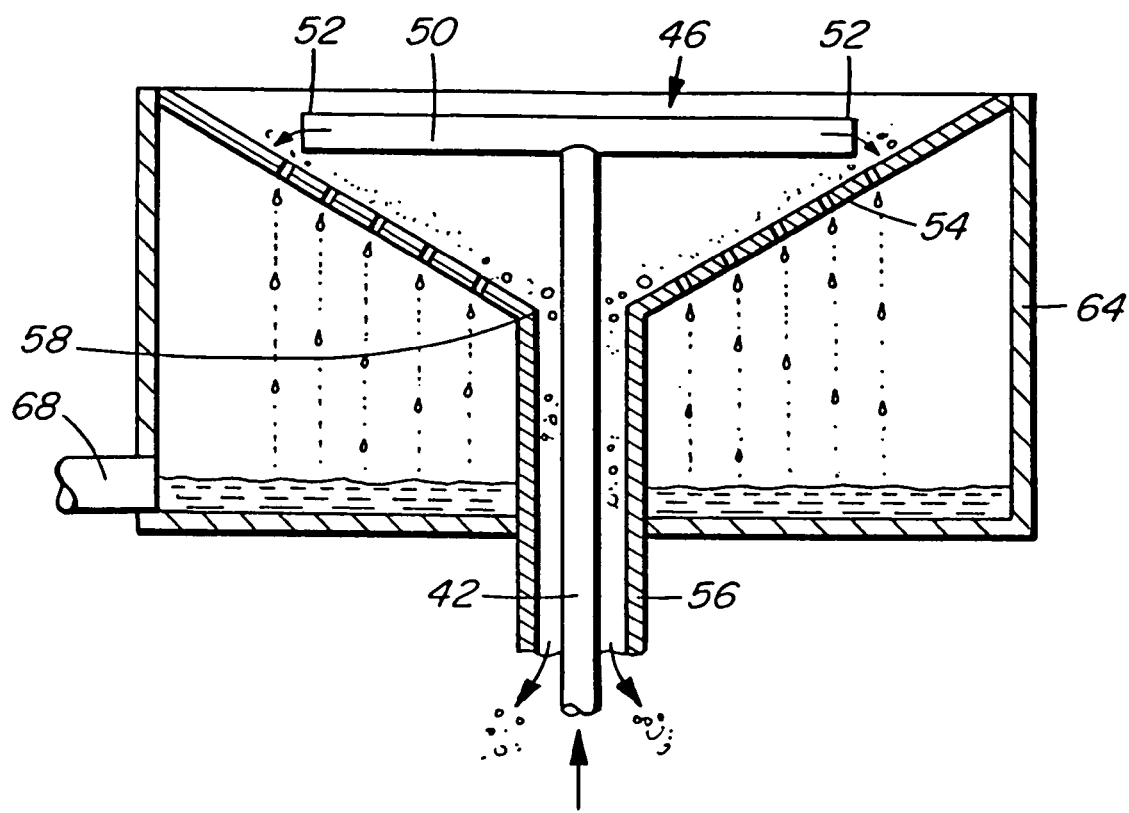
FIG. 3 shows an enlarged diagrammatic view, in vertical cross-section, through parts of the backwash system of FIG. 2.

Referring now to FIG. 2, which shows in greater detail the backwash system 30, it will be seen that this system has a waste water inlet duct or pipe 32, which extends from the outlet duct 24 of FIG. 1 into a lower region, indicated generally by reference numeral 34, of a tank 36 contained in the tank 28.

The tank 36 has a downwardly convergent bottom portion 38 containing the lower region 34 of the tank 36. An accumulation 40 of bacterial growth media particles in the form of plastic beads is provided in the lower region 34 of the tank 36.

From this lower region 34, and more particularly from the interior of the accumulation 40 of microbial growth media particles, a vertical duct 42 extends upwardly, from an open lower end 44 to a duct outlet, indicated generally by reference numeral 46, at an upper region 48 of the tank 36. The duct outlet is in the form of a Tee formed by a horizontal duct 50 communicating with the upper end of the vertical duct 42. The horizontal duct 50 has opposite ends 52 which open directly above a downwardly convergent frusto-conical strainer 54 of perforated sheet metal. The microbial growth medial particles, in the present embodiment of the invention, comprise plastic beads, but it is to be understood that these particles may alternatively comprise clay particles or any other particles suitable for being coated with bacteria for promoting anoxic metabolization in the waste water.

A solids return duct 56, which is coaxial with and radially outwardly spaced from the vertical pipe 42, has an upper end 58, which opens through the lowermost portion of the strainer 54, and a lower end 60, which opens into a body of water 62 above the accumulation 40 of plastic beads.

A liquid collector in the form of a cylindrical housing 64 is provided beneath the strainer 54 and, thus, beneath liquid leakage openings 64 in the strainer 54 for collecting water which drains downwardly through the openings 64 in the strainer 54. The housing 64 has an outlet duct 68 extending from the housing 64 through the tank 26 to the settlement tank 12, as shown in FIG. 1, for discharging effluent from the housing 64 into the settlement tank 12, and thus, recycling this effluent and backwashing the waste water treatment system in the tanks 12 and 26.

An air pump or compressor 70 supplies compressed air through an air supply duct 72, which communicates with the vertical duct 42 in the lower region 34 of the tank 36.

The tank 36 is also provided with an overflow outlet 74 for the outflow of liquid from the tank 36 to a disposal system (not shown).

The operation of the backwash system 30 is as follows:—

Waste water passing through the inlet duct 32 into the accumulation 40 of plastic beads at the lower region 34 of the tank 36 is subjected, as is well known, to bacterial digestion to the tank 36 by bacteria which grow on the plastic beads 40.

The compressed air which flows through the air supply duct 72 into the vertical duct 42 impels the waste water from the lower region 34 of the tank 36 upwardly along the interior of the vertical duct 42 to the duct outlet 46, at which this waste water is discharged through the open ends 52 of the horizontal duct 50 onto the upper surface of the frusto-conical strainer 54.

Solids in this waste water then slide under gravity down the upper surface of the strainer 54 into the solids return pipe 56 and are discharged into the body of water 61 above the plastic bead accumulation 40 through the open lower end 60 of the solids return pipe 56.

Liquid which leaks downwardly through the openings 66 of the strainer 54 and accumulates in the liquid collector housing 64 is then recycled through the duct 68 to the settlement tank 12.

As will be apparent to those skilled in the art, various modifications may be made in the above-described backwash system and method of treating and backwashing waste water within the scope of the appended claims.

I claim:

1. A backwash system for a waste treatment system, comprising:—
   a tank;
   a waste inlet duct extending into a lower region of the tank;
   an accumulation of microbial growth media particles in the lower region of the tank;
   a vertical duct extending from the lower region of the tank and having a duct outlet in an upper region of the tank;
   a downwardly convergent strainer extending around the vertical duct beneath the duct outlet, the strainer having liquid leakage openings in the strainer:
   a liquid collector beneath the liquid leakage openings;
   a liquid outlet from the liquid collector communicating with the exterior of the tank;
   a solids return duct having an upper end opening through the downwardly convergent strainer and a lower end opening above the accumulation of microbial growth media particles; and
   an air inlet duct communicating with the vertical duct at the lower region of the tank.

2. A backwash system as claimed in claim 1, wherein the duct outlet comprises a horizontal duct extending in opposite directions from the vertical duct, the horizontal duct having opposite ends opening above the downwardly convergent strainer.

3. A backwash system as claimed in claim 1, wherein the strainer is a frusto-conical perforated sheet metal strainer.

4. A backwash system as claimed in claim 3, wherein the solids return duct extends co-axially around the vertical duct and the upper end of the solids return duct opens into a lowermost portion of the downwardly convergent strainer.

5. A method of treating and backwashing waste water from a waste water treatment tank, comprising the steps of:—
   introducing the waste water into an accumulation of microbial growth media particles;
   impelling the waste water upwardly from the accumulation of microbial growth media particles to a separation region;
   discharging the waste water at the separation region into a downwardly convergent strainer;
   collecting water draining through the strainer in a collection space beneath the strainer;
   allowing solid material from the waste water to pass downwardly under gravity on the strainer to a return opening at a lowermost region of the strainer; and through the return opening into the accumulation of microbial growth media particles; and
   returning the waste water from the collection space to the waste treatment system.

6. A method as claimed in claim 5, in which the step of impelling the waste water upwardly from the accumulation of microbial growth media comprises discharging air into a duct having a lower end opening into the accumulation so that the discharged air draws the waste water upwardly along the duct from the lower end thereof.

7. A method as claimed in claim 5, in which the step of allowing solid material to pass downwardly into the accumulation of microbial growth media comprises discharging the solid material into a body of waste water above the accumulation of microbial growth media.

8. A method as claimed in claim 5, in which the step of allowing the solid material to pass into the accumulation of microbial growth media comprises ducting the solid material downwardly from the strainer into the body of waste water.

9. A method as claimed in claim 8, in which the step of collecting the water draining through the strainer comprises allowing the water to flow through openings in a downwardly convergent surface of the strainer while the solid material passes downwardly on the convergent surface to the return opening.

* * * * *